Figure 1:
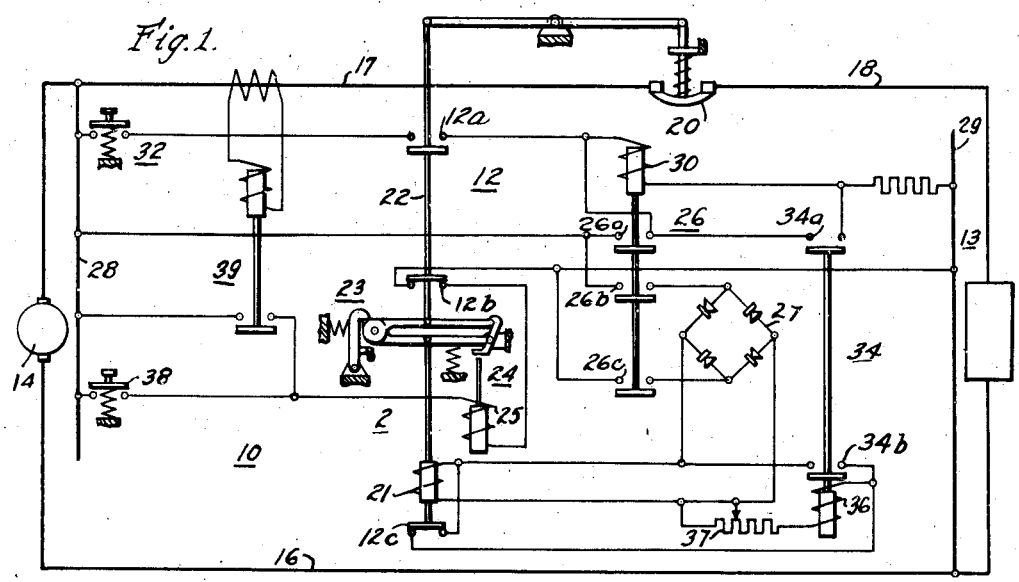

Jan. 15, 1946.     M. E. REAGAN     2,393,060

CONTROL SYSTEM

Filed Dec. 11, 1943

WITNESSES:

INVENTOR
Maurice E. Reagan.
BY
ATTORNEY

Patented Jan. 15, 1946

2,393,060

UNITED STATES PATENT OFFICE 2,393,060

CONTROL SYSTEM

Maurice E. Reagan, Wilkinsburg, Pa., assignor to Westinghouse Electric Corporation, East Pittsburgh, Pa., a corporation of Pennsylvania Application December 11, 1943, Serial No. 513,897

12 Claims. (Cl. 175—294)

My invention relates generally to control systems and has reference in particular to circuit breaker control systems.

Generally stated, it is an object of my invention to provide a circuit breaker control system which is simple and inexpensive to manufacture and which is reliable and positive in operation.

More specifically, it is an object of my invention to provide for using the stored energy of an electromagnetic circuit breaker closing mechanism for insuring proper operation of a circuit breaker control system.

It is also an object of my invention to provide for maintaining certain necessary elements of a circuit breaker control system energized for a predetermined time interval after deenergization of the circuit breaker operating means.

Another object of my invention is to provide an anti-pumping control system for a circuit breaker which utilizes the stored energy of the circuit breaker operating winding for positively energizing a control relay of the system when the voltage of the source fails or is considerably reduced when the circuit breaker is closed on a fault condition.

A further object of the invention is to provide for utilizing the stored electromagnetic energy of a circuit breaker operating winding for obtaining a delayed operation of a control relay in the circuit breaker control system.

Yet another object of my invention is to provide for energizing a control relay in a circuit breaker control system by means of the stored electromagnetic energy available in the operating winding of the circuit breaker when the operating winding is disconnected from a source of electrical energy.

Other objects will in part be obvious, and will in part be described hereinafter.

In practicing a preferred embodiment of my invention, the operation of a control relay in the form of a cut-off relay, which deenergizes the circuit breaker switch means in response to the closure of the breaker, is effected by connecting the cut-off relay across the operating winding of the circuit breaker which is energized from an alternating-current source through a rectifier circuit. The operating winding of the cut-off relay thus provides a discharge circuit for the stored electromagnetic energy of the circuit breaker operating winding. Since it requires an appreciable interval of time for the stored energy of the circuit breaker operating winding to be dissipated after the operating winding is disconnected from the source, an auxiliary source of electrical energy is provided which may be used for furnishing an adjustable time delay in the operation of the cut-off relay, or for providing a positive source of electrical energy for operating the cut-off relay in the event that the circuit breaker should close under fault conditions which would reduce the available source voltage below the value required for operation of the cut-off relay.

Figure 2:
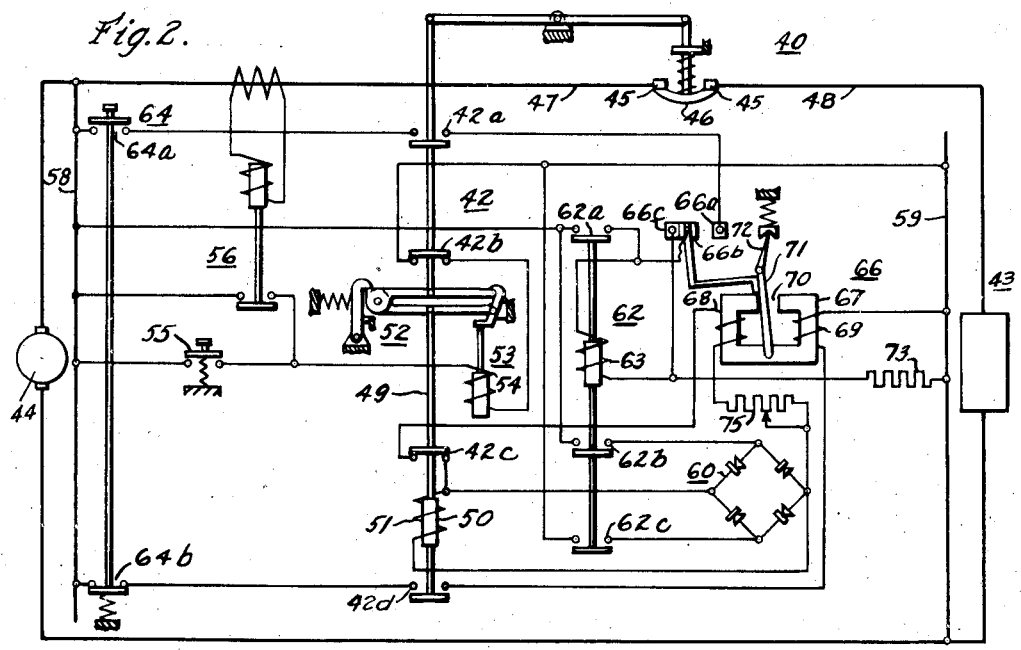
Figure 3:
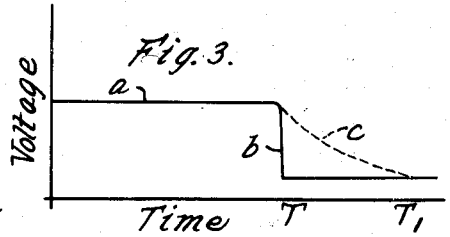

For a more complete understanding of the nature and scope of my invention, reference may be made to the following detailed description which may be studied in connection with the accompanying drawing, in which:

Figure 1 is a diagrammatic view of a circuit breaker control system embodying the principal features of my invention in one of its forms, Fig. 2 is a diagrammatic view of a circuit breaker control system embodying the principal features of my invention in another of its forms, and Fig. 3 shows curves illustrating voltage conditions in the control systems with and without the advantages of the invention.

Referring to Fig. 1, the reference numeral 10 may denote generally a circuit breaker control system wherein a circuit breaker 12 is disposed to control the connection of a load circuit 13 to a source of alternating-current 14 through conductors 16, 17 and 18.

The circuit breaker 12 may comprise main contact members 20 connecting the conductors 17 and 18, and an operating winding 21 for operating the contact members through operating members 22. A latch mechanism 23 of a type well known in the art may be provided in connection with trip means 24 having a trip winding 25 for opening the circuit breaker.

A closing operation of the circuit breaker 12 may be effected by means of relay means in the form of a closing relay 26 which is disposed to control the connection of the circuit breaker operating winding 21 to the source 14, through a rectifier circuit 27 and control conductors 28 and 29 through contact members 26b and 26c. Operation of the closing relay 26 may be effected by providing for connection of the operating winding 30 thereof to the control conductors 28 and 29 through a suitable control switch such as the push-button switch 32. A control relay in the form of a cut-off relay 34 may be provided for deenergizing the operating winding 30 of the closing relay substantially as soon as the circuit breaker closes in order to prevent pumping of the breaker.

Heretofore, it has been common practice particularly with respect to unattended or remotely controlled circuit breakers to reset the cut-off relay 34 after it has completed its function by some such means as a separate timing relay.

In order to provide for eliminating the separate timing relay and still provide for automatically resetting the cut-off relay after a suitable time delay such as will permit the cut-off relay to perform its function, its operating winding may be connected across or in shunt circuit relation with the operating winding 21 of the circuit breaker.

The operating winding 36 of the cut-off relay is also connected when the circuit breaker closes, by contact members 12c, and resistor 37 to the rectifier circuit 27, and is therefor in parallel circuit relation with the operating winding 21 of the circuit breaker. The rectifier circuit is connected to the conductors 28 and 29 through contact members 26b and 26c of the closing relay 26.

By thus connecting the operating winding 36 of the cut-off relay, energization of this operating winding will be effected in response to the closure of the circuit breaker 12, as would be the case were the operating winding 36 connected to the control conductors 28 and 29 only in the manner heretofore used, but it is maintained in its closed or the operated position for a predetermined time after the closing relay 26 opens so as to prevent pumping of the circuit breaker and then automatically resets or returns to its initial position.

By connecting the operating winding of the cut-off relay 34 in accordance with my invention as hereinbefore described, utilization is made of the relatively large amount of stored electromagnetic energy available in the operating winding 21 of the circuit breaker when it is disconnected from the source. Since quite a long interval of time on the order of 10 cycles may be required for the stored electromagnetic energy of the circuit breaker operating winding to dissipate, the cut-off relay may be maintained in the closed or operated position by utilizing this energy for any predetermined interval of time within the range of time required for the energy of the operating winding to dissipate. The cut-off relay may thus be sealed in for a predetermined interval of time, so as to prevent further reclosures until it resets. A holding circuit for the winding 36 is provided through contact members 34b of the cut-off relay.

A control resistor 37 may be provided for varying the impedance of the discharge circuit of the operating winding 21 so as to vary the time interval during which the cut-off relay is maintained in the energized position.

When the circuit breaker is in the open position, closure of a suitable switch, such as the push-button switch 32, or a remotely controlled switch, completes an energizing circuit for the operating winding 30 of the closing relay 26 through auxiliary contact members 12a of the circuit breaker. The closing relay 26 operates, closing its contact members 26b and 26c to connect the operating winding 21 of the circuit breakers to the source through the rectifier circuit 27. An obvious holding circuit for the closing relay 26 is completed by its contact members 26a.

The circuit breaker 12 closes and completes an energizing circuit for the operating winding 36 of the cut-off relay 34 from the rectifier circuit 27 which is already connected to the conductors 28 and 29 through contact members 26c of the closing relay 26 through contact members 12c. Upon the closure of the cut-off relay 34 its contact members 34a establish a shunt circuit for the operating winding 30 of the switch means 26 which effects the opening thereof to disconnect the operating winding 21 of the circuit breaker from the source. At the same time the closure of contact members 34b of the cut-off relay completes a holding circuit for the operating winding 36 in parallel circuit relation with the auxiliary contact members 12c of the circuit breaker so that this winding remains connected across the operating winding 21 of the circuit breaker through resistor 37 in the event that the breaker opens. Accordingly, the cut-off relay 34 is held closed by the stored energy of the operating winding 21 of the circuit breaker for a predetermined time after the closure or the opening of the circuit breaker.

When the cut-off relay 34 again returns to the deenergized position the closing switch 26 is again rendered responsive to the closure of switch 32 if the circuit breaker is open. The circuit breaker 12 may be opened by the closure of a trip switch 38 or the operation of a protective device such as the current responsive relay 39.

Referring to Fig. 2, the reference numeral 40 may denote, generally, a control system for controlling the operation of a circuit breaker 42 for connecting a load circuit 43 to a source 44 in a manner generally similar to that described hereinbefore in connection with the system of Fig. 1.

The circuit breaker 42 may be provided with arcing contacts 45 and main contact members 46 for connecting the conductors 47 and 48 extending between the source and the load circuit. The circuit breaker operating mechanism 49 may comprise an armature 50 having an operating winding 51 and operatively connected to the contact members 46 by means of a latch mechanism 52 of any suitable type. Trip means 53 may be provided in connection with the latch mechanism 52 having an operating winding 54 which may be energized by the closure of a trip push button switch 55 or the operation of a protective device such as the current responsive relay 56 for opening the circuit breaker.

A closing operation of the circuit breaker may be effected by connecting the operating winding 51 to suitable control conductors 58 and 59, which may be energized from the source 44, through a rectifier circuit 60 and circuit breaker switch means 62. Energization of the operating winding 63 of the closing relay 62 may be effected in any suitable manner, such as by means of a push button switch 64 or suitable control relays connected in a well-known manner, but which for purposes of simplification are not shown.

In order to provide for disconnecting the operating winding 51 of the circuit breaker 42 from the source, as soon as the breaker closes, a cut-off relay 66, may be provided. The cut-off relay 66 may, for example, be of the toggle type having a magnetic core member 67 with an operating winding 68 and a reset winding 69 positioned thereon. In this instance the core member 67 is provided with an air gap 70 in which is positioned a pivoted armature 71 which, together with an operating member 72, comprises a toggle mechanism which may be actuated to one side or the other in response to energization of either of the windings 68 and 69, and remain in the operated position until the other of the windings is energized to restore it to the previous position. The armature or toggle mechanism is provided with a moving contact member 66b for engaging a stationary contact member 66a to provide an energizing circuit for the operating winding 63 of the circuit breaker switch means 62, or a stationary contact member 66c to provide for shunting the operating winding 63.

Provision may be made for connecting the operating winding 68 of the cut-off relay in shunt circuit relation with the operating winding 51 of the circuit breaker so as to utilize the stored electromagnetic energy thereof for actuating the armature 71 to separate the contact members 66a and 66b whenever the operating winding 51 is disconnected from the source.

With the circuit breaker 42 in the closed position, as shown, it may be opened either by closing the trip switch 55 or by operation of the protective device 56. Operation of either of these devices completes an energizing circuit for the trip winding 54 through contact members 42b of the circuit breaker, which releases the latch mechanism 52, opening the contact members 46 and returning the operating mechanism 49 to the deenergized position. An energizing circuit for the reset winding 69 of the cut-off relay is thereupon provided through contact members 64b of the control switch 64 and contact members 42d of the circuit breaker.

Closure of the circuit breaker may then be effected by closing the push button switch 64 to complete an energizing circuit for the operating winding 63 of the closing relay 62 through the circuit extending from the control conductor 58, contact members 64a, contact members 42a, contact members 66a and 66b, operating winding 63 and resistor 73 to the control conductor 59. The switch means 62 operates, providing a holding circuit through contact members 62a, and connecting the operating winding 51 of the circuit breaker 42 to the control conductors 58 and 59 through the rectifier circuit 60 and contact members 62b and 62c, so that the circuit breaker 42 closes. As soon as the circuit breaker closes, an energizing circuit is provided for the operating winding 68 of the cut-off relay 66 from the rectifier circuit 60 through contact members 42c of the circuit breaker and the adjustable control resistor 75.

If operating conditions in the load circuit 43 are satisfactory, the rectifier circuit 60 may be fully energized from the source through the control conductors 58 and 59 and energization of the operating winding 68 will be normal and sufficient to actuate the cut-off relay to open the circuit through the winding 63 of the closing relay 62. Should a fault condition exist on the load circuit 43, the voltage across the control conductors 58 and 59 will be substantially reduced as soon as the main contact members 46 of the circuit breaker 42 connect the load circuit to the source. It will be understood that the main contact members 46 of the breaker may also include arcing contact members, not shown. Under these conditions, if the energization of the operating winding 68 of the cut-off relay 66 were dependent solely upon the energy supplied to the rectifier circuit 60 from the control conductors 58 and 59, satisfactory operation of the cut-off relay 66 might not be effected. However, since the operating winding 68 is also connected in shunt circuit relation with the operating winding 51 of the circuit breaker, positive operation of the cut-off relay is effected by the stored electromagnetic energy of the operating winding 51 to energize the operating winding 68 so as to secure satisfactory operation of the cut-off relay 66 so as to insure deenergization of the closing relay 62 and prevent subsequent reclosure of the circuit breaker as soon as it opens, even though a fault condition exists on the load circuit 43. Should the circuit breaker open due to a fault condition or a latch failure while being closed, it cannot reclose immediately, for the cut-off relay 66 must first be reset by returning the switch 64 to the "off" position while the circuit breaker is open, so as to provide an energizing circuit for the reset winding 69.

Referring to Fig. 3, the curve (a) may represent the voltage available for energizing the operating winding of the cut-off relay 66 under normal operating conditions either when the operating winding is connected as shown or connected separately to the control conductors in accordance with the prior practice. The portion of the curve (b) illustrates what occurs to the voltage available on the control conductors when the circuit breaker connects the load circuit to the source with a fault condition existing in the load circuit. From the curve (b) it will be apparent that after a time T when the circuit breaker contacts close, little or no voltage is available for operating the cut-off relay, so that faulty operation of the circuit breaker results. The dotted curve (c) illustrates the voltage available across the operating winding of the circuit breaker from the time T to a time T' by reason of the stored electromagnetic energy available in the operating winding thereof. By connecting the operating winding of the cut-off relay in the systems of either Fig. 1 or Fig. 2, across the operating winding of the circuit breaker, this stored electromagnetic energy may be utilized either for maintaining the cut-off relay energized for a predetermined interval of time or for insuring the proper operation of the relay under fault conditions, so as to prevent immediate reclosure or "pumping" of the circuit breaker.

From the above description and the accompanying drawing, it will be apparent that I have provided a simple and inexpensive manner for improving the operation of circuit breaker control systems. By utilizing the relatively large amount of stored electromagnetic energy available in the operating winding of the circuit breaker, positive operation of the control system may be insured under varying operating conditions.

Since certain changes may be made in the above description and different embodiments of the invention may be made without departing from the spirit or scope thereof, it is intended that all the matter contained in the above description and shown in the accompanying drawing shall be considered as illustrative and not in a limiting sense.

I claim as my invention:

1. A control system for a circuit breaker having an operating winding and relay means operable to connect the winding to a current source comprising, control means operable to render the relay means inoperative in response to the closure of the circuit breaker whereby the operating winding is disconnected from the source, and circuit means connecting the control means to the operating winding of the circuit breaker when said winding is disconnected from the source for utilizing the stored energy of the operating winding to energize said circuit means.

2. A control system for a circuit breaker having an operating winding and a closing relay for controlling the energization of the winding from a current source comprising, a cut-off relay operable to effect deenergization of the operating winding by rendering the closing relay inoperative, and circuit means connecting the cut-off relay in shunt relation with the circuit breaker operating winding when it is deenergized for utilizing the stored energy of the operating winding to operate the cut-off relay.

3. A control system for a circuit breaker connecting a load circuit to a source of alternating-current and having an operating winding arranged to be energized from the source through rectifying means comprising, relay means energizable to effect energization of the operating winding from the source through the rectifying means, a cut-off relay having an operating winding energizable to operate the relay to effect deenergization of the relay means for disconnecting the operating winding from the source, and circuit means including means responsive to operation of the circuit breaker connecting the operating winding of the cut-off relay in shunt relation with the circuit breaker operating winding for utilizing the stored energy of said winding to operate said cut-off relay.

4. A control system for a circuit breaker having an operating winding energized from an alternating-current source through a rectifier circuit comprising, a closing relay operable to connect the rectifier circuit of the source, relay means operable to render the closing relay ineffective and effect deenergization of the operating winding, and circuit means including normally open contact members of the circuit breaker connecting the relay means in shunt relation with the operating winding of the circuit breaker for energization by the stored energy of said operating winding.

5. A control system for a circuit breaker having an operating winding with a relatively large amount of energy storage capacity comprising, rectifier means for supplying a direct-current control voltage to the operating winding from an alternating-current source, control means operable to effect connection of the rectifier means to the source, relay means having an operating winding, said means being operable to render the control means inoperative, and circuit means including a contact device operable in response to closure of the circuit breaker to connect the operating winding of the relay means in shunt relation with the operating winding of the circuit breaker, whereby the relay means is maintained in the operative position for at least a predetermined time after the circuit breaker is closed while the stored energy of the circuit breaker operating winding is dissipated.

6. In combination, a circuit breaker having an operating winding operable to connect a load circuit to an alternating-current source, control means including a closing relay and rectifier means operable to apply a direct-current voltage to the operating winding from the source, and a cut-off relay operable to deenergize the closing relay and effect deenergization of the operating winding, said relay having an operating winding disposed to be connected in shunt relation with the circuit breaker operating winding when the circuit breaker closes.

7. A control system for a circuit breaker having an operating winding with sufficient stored energy to operate a control relay when said winding is deenergized comprising, rectifier means for energizing the operating winding, relay means operable to connect the rectifier means to a source of alternating current, a control relay having an operating winding and operable to render the relay means inoperative and effect deenergization of the circuit operating winding, circuit means connecting the operating winding of the control relay in parallel circuit relation with the operating winding of the circuit breaker when the circuit breaker operates to provide a discharge circuit so that the operating winding of the control relay is energized by the stored energy of the circuit breaker operating winding when the relay means is rendered inoperative, and means operable to vary the impedance of the discharge circuit of the circuit breaker operating winding to vary the time interval for which the control relay is maintained in the operative position.

8. A control system for a circuit breaker having an operating winding with sufficient stored energy to energize control means comprising, circuit means for supplying a direct-current operating voltage to the circuit breaker operating winding from a suitable source of electrical energy, relay means operable to effect energization of the operating winding from the source, control means operable to render the relay means inoperative and effect disconnection of the operating winding from the source, and circuit means connecting the control means in shunt relation with the circuit breaker operating winding upon operation of the circuit breaker and control means so as to utilize the stored energy of the said winding for retaining the control means in the operated position for a predetermined time after the operating winding of the circuit breaker is deenergized.

9. A control system for a circuit breaker having an operating winding with sufficient stored electromagnetic energy when energized to operate control means when deenergized comprising, circuit means for supplying a direct-current operating voltage to the operating winding from a source of electrical energy, relay means operable upon energization to effect energization of the operating winding from the source, control means operable to effect deenergization of the relay means and of the circuit breaker operating winding, and circuit means including an adjustable impedance connecting the control means in shunt relation with the circuit breaker operating winding upon operation of the circuit breaker for energization by the stored energy thereof.

10. In a control system for a circuit breaker having an operating winding and normally open contact means, in combination, circuit means for supplying a direct-current voltage to the operating winding from a suitable source, first relay means energizable to effect energization of the operating winding from the source, second relay means having an operating winding, circuit means including the normally open contact means of the circuit breaker connecting the operating winding of said second relay means in shunt relation with the circuit breaker operating winding for utilizing the stored energy of the circuit breaker operating winding to insure operation of said second relay means, said second relay means having a toggle action contact mechanism operable thereby to deenergize the first relay means and effect disconnection of the operating winding from the source, said second relay means having a reset winding energizable when the circuit breaker opens for resetting the toggle mechanism to prepare an energizing circuit for the first relay means.

11. In a control system for a circuit breaker disposed to connect a load circuit to an alternating-current source and having an operating winding with sufficient stored electromagnetic energy when energized to operate a control relay during a predetermined interval of time after deenergization, rectifier means disposed to be connected between the circuit breaker operating winding and the source, relay means operable to effect energization of said winding by connecting the rectifier means to the source, a control relay having a toggle contact mechanism with a pair of operating windings, circuit means including a normally open contact member of the circuit breaker connecting one of the operating windings in shunt relation with the circuit breaker operating winding for operating the control relay to an operative position to render the relay means inoperative and effect disconnection of the rectifier means from the source, and circuit means including a normally closed contact member associated with the circuit breaker for connecting the other operating winding of the control relay to return the relay to the inoperative position.

12. A control system for a circuit breaker operable to connect a load circuit to an alternating-current source and having an operating winding energizable to close the breaker comprising, a rectifier bridge circuit connected to the operating winding, relay means having an operating winding operable to connect the rectifier circuit to the alternating-current source, a control relay having an operating winding operable to effect deenergization of the relay means and disconnection of the rectifier bridge circuit from the source, circuit means including normally open contact members operatively associated with the circuit breaker connecting the operating winding of the control relay in shunt relation with the operating winding of the circuit breaker so as to utilize the stored energy of the circuit breaker operating winding to maintain the energization of the control relay operating winding for a predetermined time after the relay means disconnects the circuit breaker operating winding from the source, and a holding circuit for maintaining the control relay energized by means of the stored energy including normally open contact members operatively associated with the control relay and connected in shunt circuit relation with the normally open contact members associated with the circuit breaker.

MAURICE E. REAGAN.